(12) United States Patent
Noske

(10) Patent No.: US 11,377,928 B2
(45) Date of Patent: Jul. 5, 2022

(54) DOWNHOLE ISOLATION VALVES WITH PRESSURE RELIEF

(71) Applicant: Weatherford Technology Holdings, LLC, Houston, TX (US)

(72) Inventor: Joe Noske, Houston, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 150 days.

(21) Appl. No.: 15/931,436

(22) Filed: May 13, 2020

(65) Prior Publication Data

US 2021/0355789 A1    Nov. 18, 2021

(51) Int. Cl.
| | |
|---|---|
| *E21B 34/08* | (2006.01) |
| *E21B 34/12* | (2006.01) |
| *F16K 17/04* | (2006.01) |
| *F16K 17/08* | (2006.01) |

(52) U.S. Cl.
CPC .............. *E21B 34/08* (2013.01); *E21B 34/12* (2013.01); *F16K 17/046* (2013.01); *F16K 17/082* (2013.01); *E21B 2200/05* (2020.05)

(58) Field of Classification Search
CPC ...... E21B 34/12; E21B 34/08; E21B 2200/05; E21B 34/101; F16K 17/046; F16K 17/082
See application file for complete search history.

(56) References Cited

U.S. PATENT DOCUMENTS

| | | | |
|---|---|---|---|
| 4,376,464 A | 3/1983 | Crow | |
| 4,415,036 A | 11/1983 | Carmody et al. | |
| 4,478,286 A * | 10/1984 | Fineberg | E21B 34/101 |
| | | | 166/324 |
| 6,079,497 A * | 6/2000 | Johnston | E21B 34/101 |
| | | | 166/324 |
| 6,283,217 B1 * | 9/2001 | Deaton | E21B 34/101 |
| | | | 166/332.7 |
| 6,644,408 B2 * | 11/2003 | Ives | F16K 1/2014 |
| | | | 166/332.7 |
| 8,701,781 B2 | 4/2014 | Henschel et al. | |
| 9,062,519 B2 | 6/2015 | Kucera et al. | |
| 9,255,463 B2 | 2/2016 | Megill et al. | |
| 9,518,444 B2 | 12/2016 | Thompson | |
| 10,077,631 B2 | 9/2018 | Kucera et al. | |
| 10,107,075 B2 * | 10/2018 | Grayson | E21B 34/101 |
| 2002/0084076 A1 * | 7/2002 | Ives | F16K 39/024 |
| | | | 166/324 |
| 2016/0281465 A1 * | 9/2016 | Grayson | E21B 34/101 |
| 2018/0223651 A1 * | 8/2018 | McDowell | E21B 47/117 |

* cited by examiner

*Primary Examiner* — Michael R Wills, III
(74) *Attorney, Agent, or Firm* — NZ Carr Law Office PLLC

(57) ABSTRACT

The present disclosure generally relates to a flapper valve including a pressure relief assembly. The pressure relief assembly is operable to activate when a pressure differential across the flapper approaches or exceeds a design pressure of the flapper.

20 Claims, 13 Drawing Sheets

DOWNHOLE ISOLATION VALVES WITH PRESSURE RELIEF

BACKGROUND

Field

Embodiments of the present disclosure generally relate to isolation valves for use in a wellbore. Particularly, embodiments of the present disclosure relate to isolation valves with a pressure relief assembly and method for using the isolation valves.

Description of the Related Art

In hydrocarbon exploration and production, a hydrocarbon bearing formation is accessed by drilling a wellbore from the surface of the earth to the formation. After the wellbore is drilled to a certain depth, a casing/liner is typically inserted into the wellbore and an annulus between the casing/liner and the earth is filled with cement. The casing/liner strengthens the borehole, and the cement helps to isolate areas of the wellbore during further drilling and hydrocarbon production.

Isolation valves may be used as part of the casing/liner during drilling, completion or production. When closed, an isolation valve temporarily isolates a formation pressure below the isolation valve from a portion of the wellbore above the isolation valve. The temporary pressure isolation allows a drill or work string to be quickly and safely inserted into the portion of the wellbore above the isolation valve.

Some isolation valves are flapper valves. During operation, pressure build up below a closed flapper in an isolation valve may exceed the design limit of the flapper causing the flapper to rupture and resulting in an uncontrolled release of pressure.

Therefore, there exists a need to solve the above deficiencies.

SUMMARY

Embodiments of the present disclosure generally relate to downhole isolation valves with a pressure relief assembly and method for performing a wellbore operation using the downhole isolation valves.

Embodiments of the present disclosure provide a valve assembly. The valve assembly comprises a housing, a valve body defining a valve bore and disposed in the housing, wherein a relief port is formed through the valve body, a flapper movably attached to the valve body between an open position and a closed position to open and close the valve bore, and a pressure relief assembly operable to open the relief port when a pressure differential across the flapper reaches an activation pressure differential.

Some embodiments of the present disclosure provide a method for performing a wellbore operation. The method comprises closing a flapper in a valve disposed in a wellbore to isolate an upper section of the wellbore from a lower section of the wellbore, wherein the valve comprises a pressure relief assembly operable to open a relief port through the valve when a pressure differential across the flapper reaches an activation pressure differential, and evaluating one or more wellbore operating parameters from surface to determine whether the relief port is open.

Some embodiments of the present disclosure provide an isolation valve. The isolation valve comprises a housing, a valve body disposed in the housing, wherein the valve body comprises a valve bore extending through the valve body, a relief volume formed between the valve body and the housing, a relief port formed through the valve body to provide fluid communication between the valve bore and the relief volume, a flapper coupled to the valve body and movable between an open position and a closed position to open and close the valve bore, a piston disposed in the relief volume, wherein the piston is movable to open and close the relief port, and a biasing member connected to the piston to bias the piston to close the relief port when a pressure differential across the flapper is less than an activation pressure differential.

BRIEF DESCRIPTION OF THE DRAWINGS

So that the manner in which the above-recited features of the present disclosure can be understood in detail, a more particular description of the implementations, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

Figure 1A:
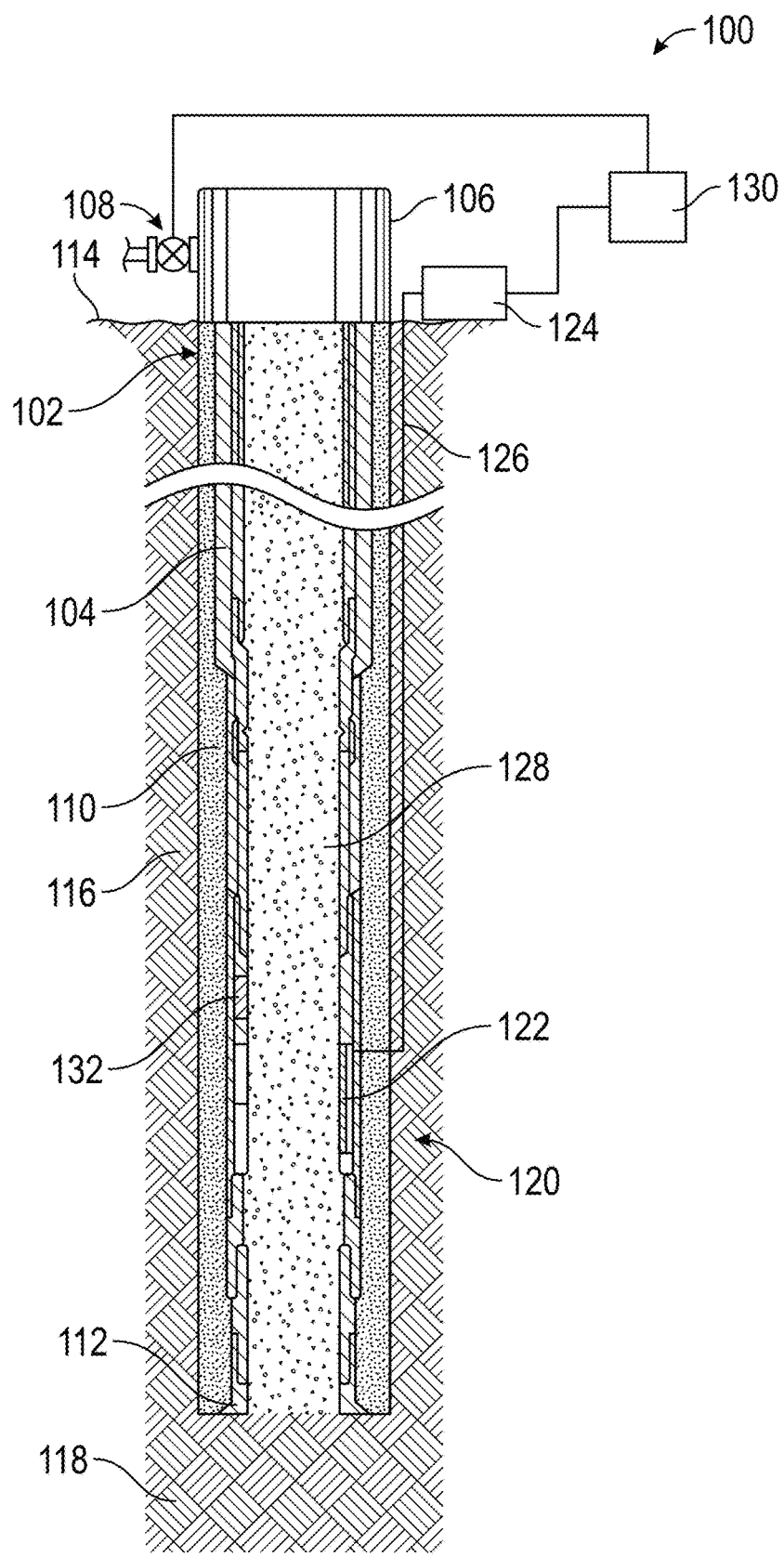
FIGS. 1A-1D schematically illustrate operations of a well system according to embodiments of the present disclosure.

To facilitate understanding, identical reference numerals have been used, where possible, to designate identical elements that are common to the figures. It is contemplated that elements and features of one implementation may be beneficially incorporated in other implementations without further recitation. It is to be noted, however, that the appended drawings illustrate only exemplary implementations of this disclosure and are therefore not to be considered limiting of its scope, for the disclosure may admit to other equally effective implementations.

DETAILED DESCRIPTION

The following disclosure describes downhole isolation valves with pressure relief to prevent flapper rupture, and method for performing wellbore operation using the downhole isolation valves. Details are set forth in the following description and in FIGS. 1A-4 to provide a thorough understanding of various implementations of the disclosure. Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

Embodiments of the present disclosure generally relate to a flapper valve including a pressure relief assembly. The pressure relief assembly is operable to activate when a pressure differential across the flapper approaches or exceeds a design pressure of the flapper. In some embodiments, the pressure relief assembly activates automatically in response to a pressure change below a closed flapper valve. When activated, the pressure relief assembly opens a flow path to enable a controlled pressure release across the flapper. In some embodiments, one or more wellbore parameters may be monitored or evaluated to detect the activation of the pressure relief assembly from the surface. In some embodiments, remedial operations are performed after the pressure relief assembly in the isolation valve is activated.

FIGS. 1A-1D schematically illustrate operations of a well system 100 according to embodiments of the present disclosure. The well system 100 can be at various operating modes, such as drilling mode, completion mode, production mode, or intervention mode.

The well system 100 is disposed in a wellbore 102. The wellbore 102 is formed under surface 114 through an upper formation 116. A casing string 104 is disposed in the wellbore 102. The casing string 104 is held in pace by cement 110.

In FIGS. 1A-1D, the casing string 104 is shown extending from the surface 114 along the wellbore 102 to a casing shoe 112. A central bore 128 extends through the casing string 104. A wellhead 106 is placed on the surface 114 and in connection with the central bore 128 of the casing string 104. A valve assembly 108 is attached to the wellhead 106. The valve assembly 108 is operable to control fluid flow to and from the central bore 128. In some embodiments, the valve assembly 108 may include one or more flow meters or pressure gauges configured monitor fluid flow through the wellhead 106. During certain operations, such as drilling, completion, and intervention, a rig (not shown) may be installed over the wellhead 106 to handle work strings for the operations. Alternatively, instead of extending from the surface 114, the casing string 104 may be hanging from a casing shoe of an outer casing string, which is positioned downhole. In other embodiments, the casing string 104 may be one of a series of casing strings hanging from the surface 114.

An isolation valve 120 according to the present disclosure is installed in the casing string 104 near the casing shoe 112. The isolation valve 120 is operable to open and close the central bore 128 of the casing string 104. Sometimes, the isolation valve 120 may be referred to as a downhole deployment valve (DDV) by persons in the field of oil and gas exploration and production. The isolation valve 120 may be an integral part of the casing string 104 and is run into the wellbore 102 prior to cementing.

Figure 1B:
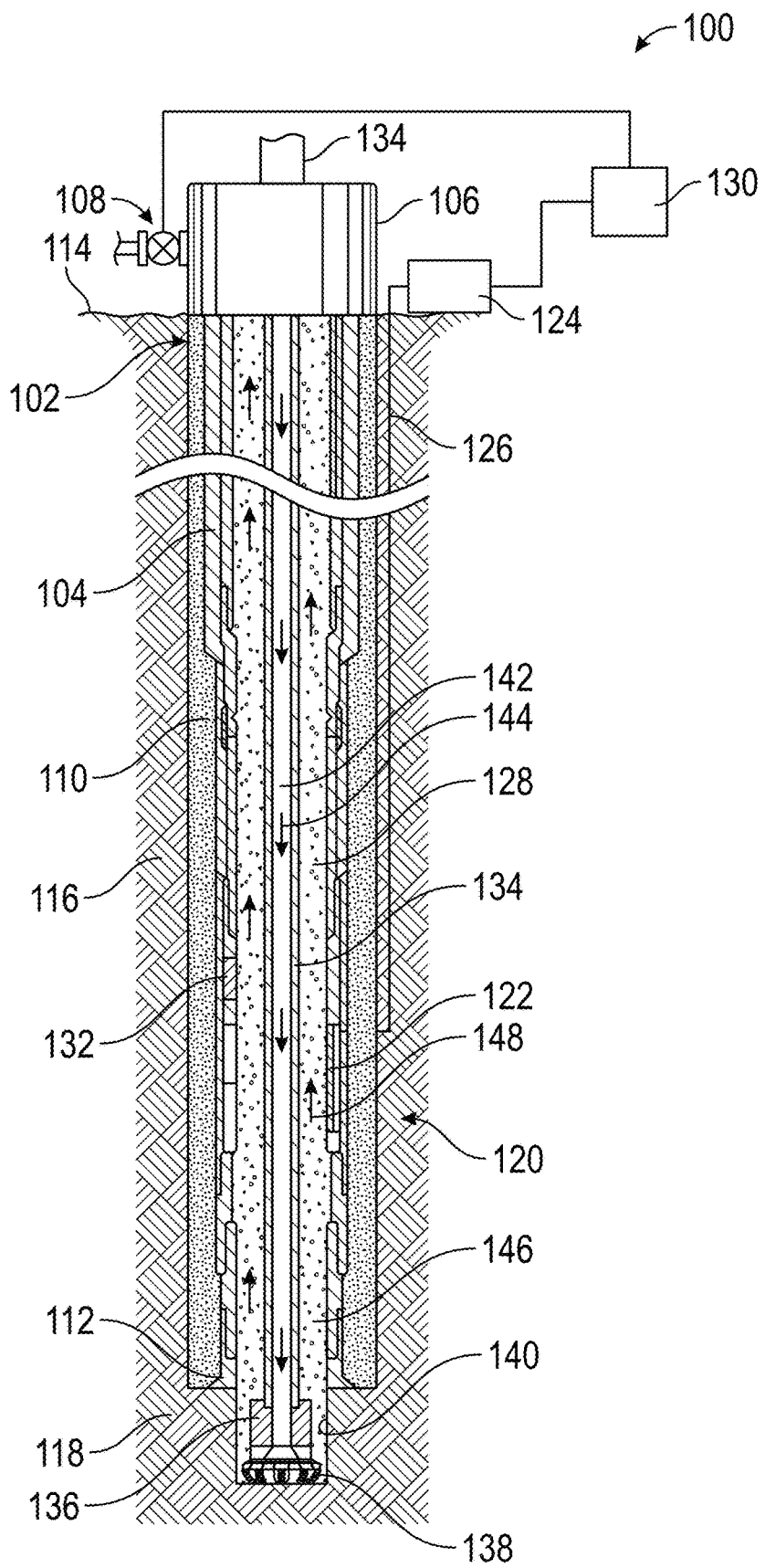

According to the present disclosure, the isolation valve 120 includes a flapper 122 movable between an open position, as shown in FIG. 1A, and a closed position, as shown in FIG. 1B. Opening and closing of the isolation valve 120 may be achieved using hydraulic power, electrical power, or pneumatic power. In some embodiments, the isolation valve 120 may be remotely operated using a power unit 124 positioned on the surface 114. In some embodiments, the power unit 124 is a hydraulic power unit. The power unit 124 is connected to the isolation valve 120 through control lines 126.

According to the present disclosure, the isolation valve 120 includes a pressure relief assembly 132 configured to protect the flapper 122 from being damaged by pressure differentials when the flapper 122 is at the closed position. In some embodiments, when the pressure differential across the flapper 122 approaches or exceeds a predetermined value, the pressure relief assembly 132 enables a fluid flow across the flapper 122 to reduce the pressure differential across the flapper 122 in a controlled matter. In some embodiments, the pressure relief assembly 132 is configured to selectively open and close a flow path across the flapper 122. The flow path may be formed through a valve body of the isolation valve 120. The pressure relief assembly 132 will be discussed in detail with FIGS. 2A-2C and 3A-3C.

In some embodiments, the well system 100 includes a controller 130. The controller 130 may include a programmable logic controller (PLC), or a computer. The controller 130 may be located on the surface 114 or remotely positioned. The controller 130 is in communication with the power unit 124 and configured to open, close, or reset the isolation valve 120.

In some embodiments, the controller 130 is connected to one or more sensors and use the measurements of the sensors to determine the status of the isolation valve 120. For example, the controller 130 includes a program configured to detect the status of the pressure relief assembly 132 in the isolation valve 120 and trigger various operations according to the status of the pressure relief assembly 132.

In some embodiments, the controller 130 is connected to flow meters or pressure gauges in the valve assembly 108 to monitor and evaluate the flow and/or pressure across the wellhead 106. In some embodiments, the controller 130 may include a program configured to determine the status of the pressure relief assembly 132 in the isolation valve 120 according to the measurements from the meters in the valve assembly 108. In some embodiments, the controller 130 is configured to communicate with the power unit 124 to open, close or reset the isolation valve 120 according to measurements of flow and/or pressure across the wellhead 106.

Alternatively, the controller 130 may be connected with sensors located within the wellbore 102 or on the surface 114 to determine the pressure differential across the flapper 122. For example, the controller 130 may be connected to pressure sensors on opposing sides of the flapper 122.

In FIG. 1A, the isolation valve 120 is in an open position. When the isolation valve 120 is open, work strings can be deployed through the central bore 128 to perform various well operations. In FIG. 1B, a drill string 134 is deployed through the central bore 128 of the casing string 104. The drill string 134 includes a BHA (bottom hole assembly) 136 having a drill bit 138. The BHA 136 extends beyond the casing shoe 112. A drilling fluid 144 is pumped down from the surface 114 through a central bore 142 in the drilling string 134 to the drill bit 138. The drill bit 138 rotates to make a bore hole 140 through a lower formation 118. Cuttings 148 from the drill bit 138 return to the surface 114 with the drilling fluid 144 through an annulus 146 between the casing string 104 and the drill string 134.

Figure 1C:
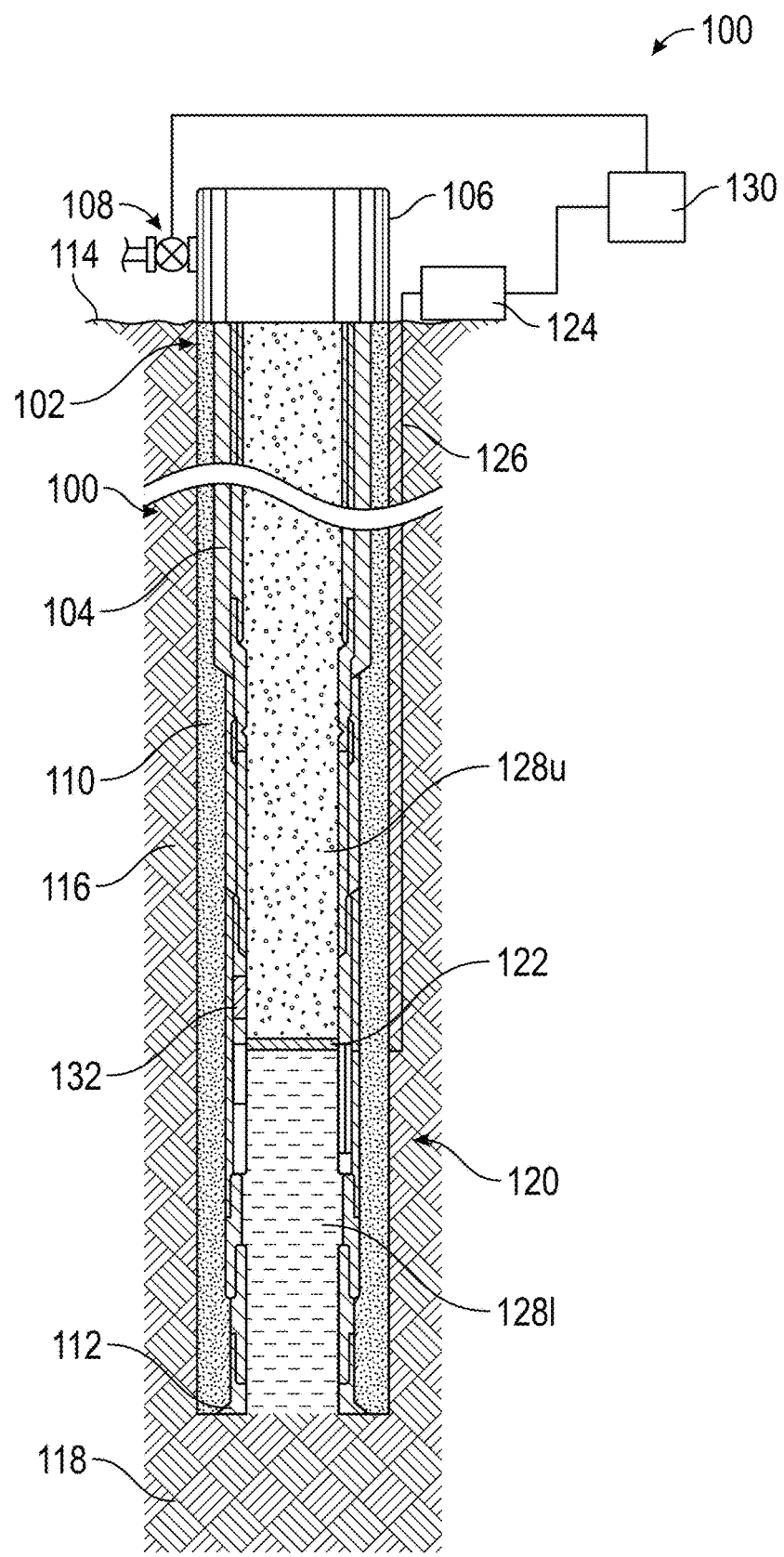

In FIG. 1C, the isolation valve 120 is in a closed position. The flapper 122 isolates an upper section 128u of the central bore 128 from a lower section 128l of the central bore 128. The well system 100 may be in the status shown in FIG. 1C when there is need to close the lower section 128l of the central bore 128, for example during tripping-in or tripping-out of a work string, closing off the lower formation 118, or a pressure control operation.

Figure 1D:
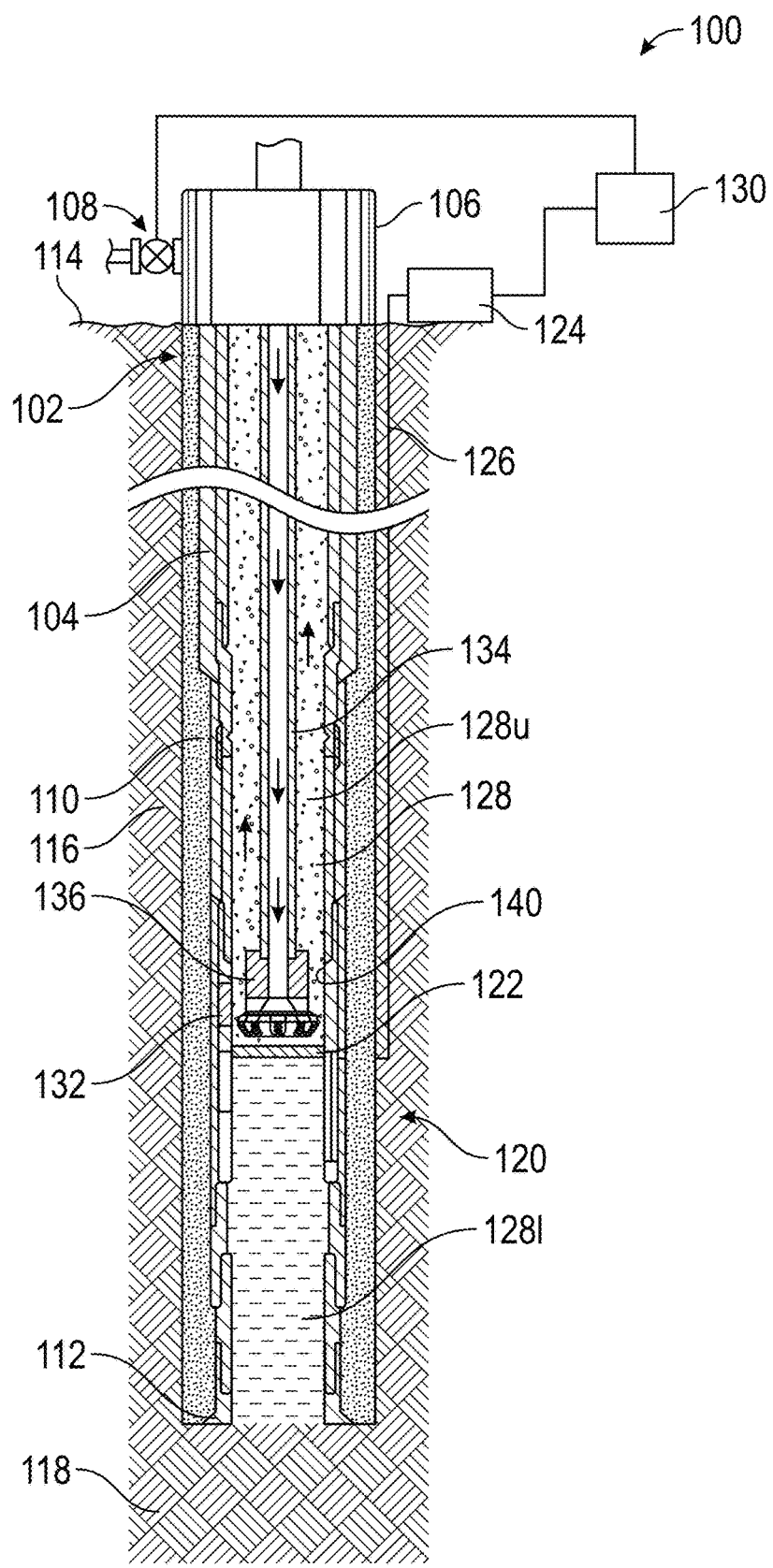

FIG. 1D schematically illustrates a tripping-out operation, where the drill string 134 is being pulled up through the casing string 104. The tripping-out operation may be performed after drilling the bore hole 140 in the lower formation 118, or during the drilling operation when there is a need to pull out the drill string 134. As shown in FIG. 1D, after the BHA 136 is pulled above the isolation valve 120, the isolation valve 120 is closed. The flapper 122 isolates the lower section 128l and the bore hole 140 from the upper section 128u.

When the upper section 128u of the wellbore 102 is isolated from the lower section 128l and the bore hole 140, the pressure in the upper section 128u can be bled out through the valve assembly 108 at the surface 114 of the well system 100. The wellhead 106 can then be opened safely to perform operations such as inserting or removing a string of tools.

In the position of FIGS. 1C and 1D, there is a pressure differential across the flapper 122. The flapper 122 has a design pressure differential, which is the maximum pressure differential under which the flapper 122 can maintain physical integrity. During operation, the pressure differential across the flapper 122 can be controlled by applying a pressure from the surface 114 in the upper section 128u, using volume weight of fluid with suitable density in the upper section 128u, or maintain a certain tripping speed of the drill string 134. The pressure differential across the flapper 122 may change under various conditions, for example, when there is a pressure kick below the flapper 122, an increase in tripping speed of the drill string 134, a loss in pressure or fluid circulation above the flapper 122, or the like. If the pressure differential across the flapper 122 reaches or exceeds the design pressure differential of the flapper 122, the flapper 122 may rupture causing a blowout.

According to the present disclosure, the pressure relief assembly 132 is set to open a flow path between the upper section 128u and the lower section 128l when the pressure differential across the flapper 122 reaches a predetermined activation pressure differential. The predetermined activation pressure differential is set according to the design pressure of the flapper 122. In some embodiments, the design pressure of the flapper 122 is based on yield strength, fracture strength, or an average of yield and fracture strengths of the flapper 122.

The predetermined activation pressure differential may vary according to different applications. For example, the predetermined activation pressure differential may be selected based on the design pressure of the flapper 122 or based on the maximum design pressure of the flapper 122. In some embodiments, the predetermined activation pressure differential is between about 100% to about 115% of the design pressure of the flapper 122. For example, the predetermined activation pressure differential is between about 105% to about 110% of the design pressure of the flapper 122.

In some of embodiments, the predetermined activation pressure differential is equal to or slightly greater than the design pressure of the flapper 122. In some embodiments, the predetermined activation pressure differential is slightly less than the maximum design pressure of the flapper 122. In some embodiments, the predetermined activation pressure differential is between about 80% to 100% of the design pressure of the flapper 122. For example, the predetermined activation pressure differential is between about 90% to 95% of the design pressure of the flapper 122.

When the pressure differential across the flapper 122 reaches the predetermined pressure differential, the pressure relief assembly 132 is activated to open a flow path between the upper section 128u and the lower section 128l to reduce the pressure differential across the flapper 122. After the pressure relief assembly 132 is activated, the controller 130 detects the activation from change in sensor or meter measurement and initiates remedial operations. In one embodiment, the controller 130 detects activation of the pressure relief assembly 132 by detecting a flow from the upper section 128o at the wellhead 106. The controller 130 may perform one or more remedial operations to reduce the pressure differential immediately. For example, the controller 130 may open the isolation valve 120, slow down the tripping speed, increase fluid density in the upper section 128u, increase pressure from the wellhead, reset the isolation valve 120, take other suitable actions, or a combination thereof.

The drilling operation shown in FIGS. 1B and 1D is one example of using the isolation valve 120 according to the present disclosure. Other work strings, such as cementing strings, production strings, intervention strings, logging strings may be used in place of the drill string 134 for other operations.

FIGS. 2A-2D are schematic sectional views of a downhole isolation valve 200 according to one embodiment of the present disclosure. The downhole isolation valve 200 can be used in place of the isolation valve 120 in FIGS. 1A-1D.

Figure 2A:
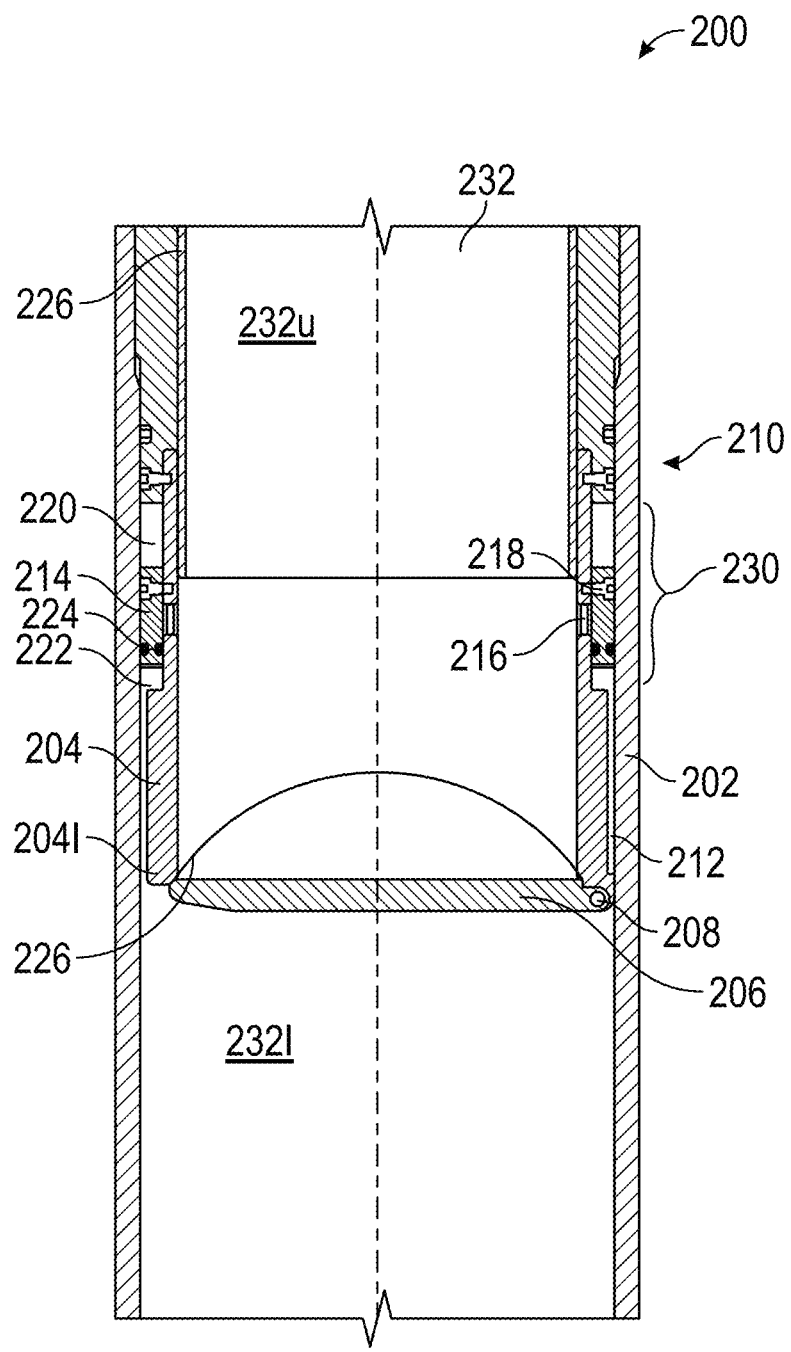
FIGS. 2A-2D are schematic sectional views of a downhole isolation valve according to one embodiment of the present disclosure.
Figure 2B:
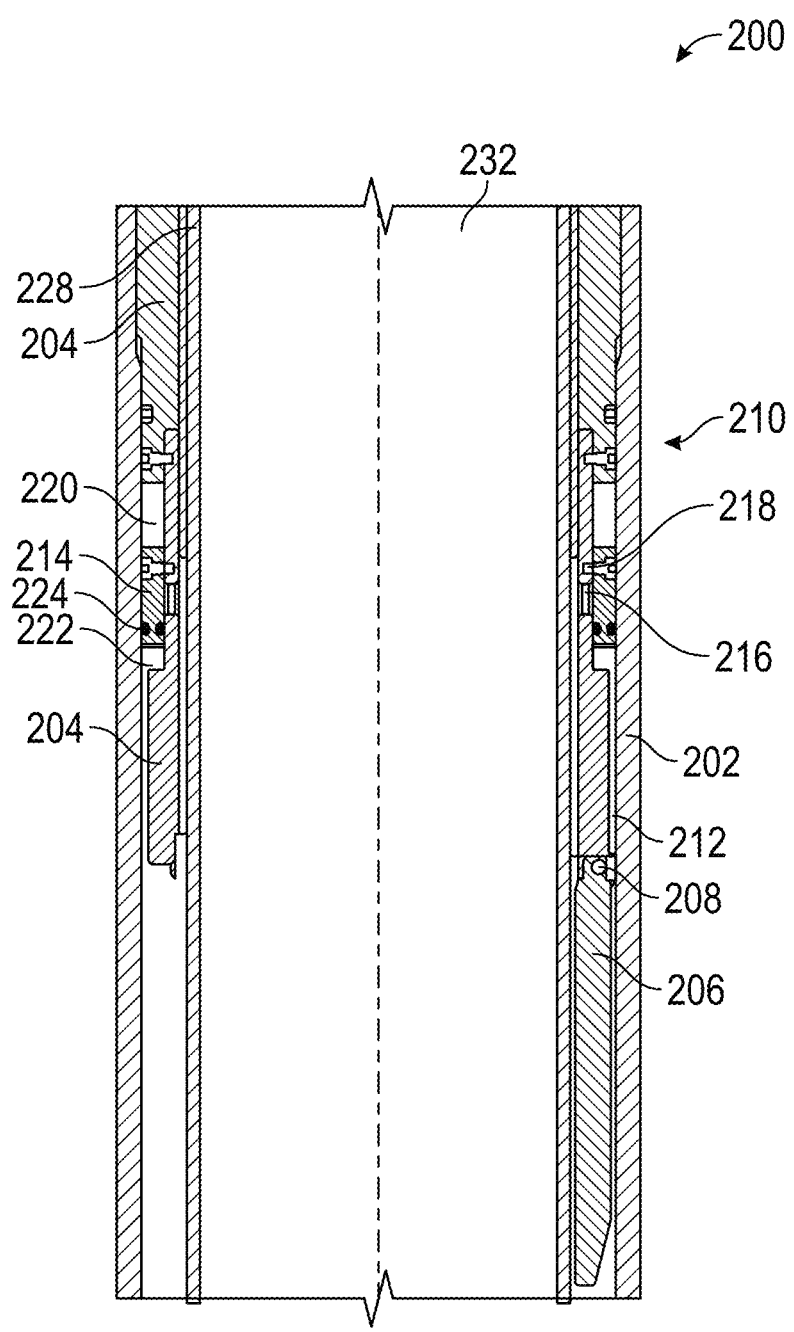

The downhole isolation valve 200 includes a housing 202. The housing 202 may be a tubular housing adapted to connect with tubular components, such as casing joints, to form a tubular string. A valve body 204 is disposed in the housing 202. The housing 202 and the valve body 204 define a valve bore 232. To facilitate manufacturing and assembly, the valve body 204 may include one or more sections connected together, such as fastened with threaded couplings and/or fasteners. In some embodiments, the valve body 204 is fixedly attached to the housing 202. A flapper 206 is pivotally connected to the valve body 204 by a hinge 208. The flapper 206 pivots about the hinge 208 between a closed position as shown in FIG. 2A and an open position as shown in FIG. 2B. In some embodiments, the hinge 208 may include one or more springs configured to bias the flapper 206 towards the closed position.

The valve body 204 has a valve seat 226 formed at on a lower end 204l. When in the closed position, an inner periphery of the flapper 206 engages the valve seat 226, thereby isolating an upper section 232u of the valve bore 232 from a lower section 232l of the valve bore 232. In some embodiments, the interface between the flapper 206 and the valve seat 226 is a metal to metal seal.

The downhole isolation valve 200 further includes a flow sleeve 228. The flow sleeve 228 is movably positioned inside the valve body 204. An actuator (not shown) is connected to the flow sleeve 228 to move the flow sleeve 228 along a longitudinal direction within the valve body 204. The actuator may be a hydraulic actuator, an electric actuator, or a pneumatic actuator, or other suitable actuators. In some embodiments, the movement of the flow sleeve 228 is controlled remotely, such as using control lines from surface, RFID tags, wireless communication, or other remote control means.

When the flow sleeve 228 moves up and stays clear from the flapper 206, the flapper 206 is biased towards the closed position by spring members of the hinge 208. When the flow sleeve 228 moves down, the flow sleeve 228 engages the flapper 206, thereby pushing the flapper 206 to the open position and moving the flapper 206 behind the flow sleeve 228 for protection from fluid flow in the valve bore 232.

According to embodiments of the present disclosure, the downhole isolation valve 200 includes a pressure relief assembly 210. The pressure relief assembly 210 is operable to protect integrity to the flapper 206 by providing a pressure relief path when a pressure differential across the flapper 206 approaches or exceeds a designed pressure differential of the flapper 206.

Figure 2C:
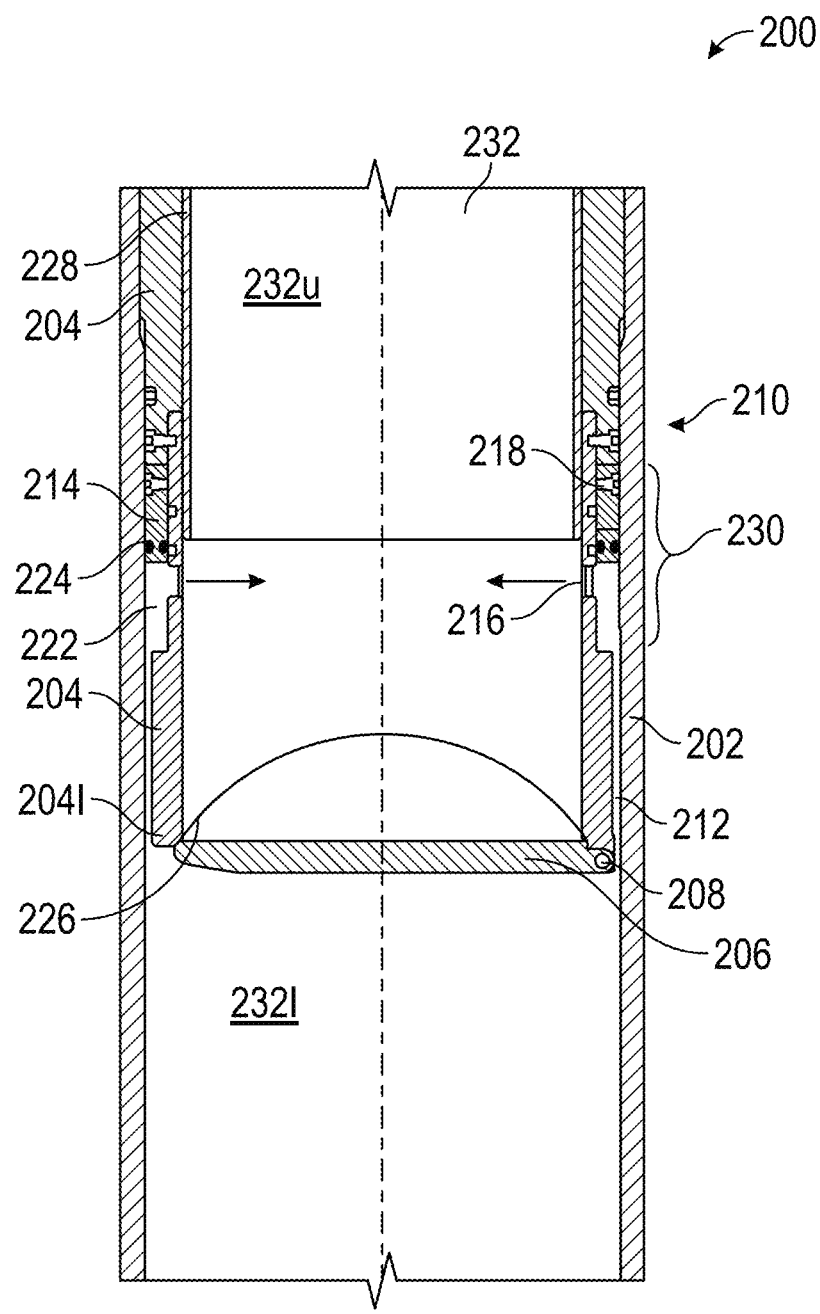
Figure 2D:
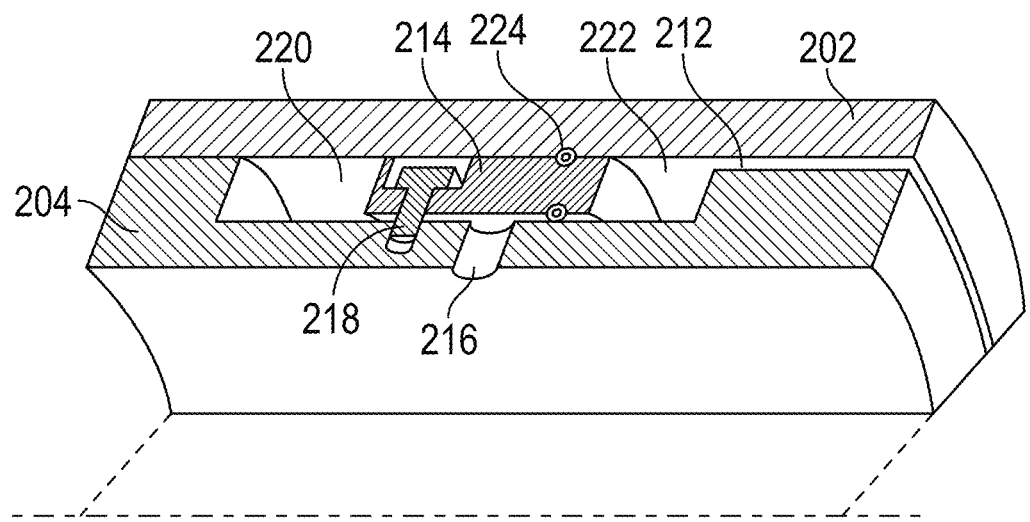

FIG. 2D is a schematic partial enlarged view of the downhole isolation valve 200 showing details of the pressure relief assembly 210. The pressure relief assembly 210 includes a piston 214 movably disposed in a relief volume 230. The relief volume 230 is formed between the valve body 204 and the housing 202. In some embodiments, the relief volume 230 is formed within annular space between an inner surface of the housing 202 and an outer surface of the valve body 204.

One or more relief ports 216 are formed through the valve body 204. The one or more relief ports 216 provide fluid communication between the valve bore 232 and the relief volume 230. In some embodiments, a plurality of relief ports 216 are formed along a circumference of the valve body 204. The plurality of relief ports 216 may be evenly distributed along the circumference of the valve body 204.

The piston 214 is vertically movable in the relief volume 230. One or more seal members 224 is positioned between the piston 214 and the housing 202, and between the piston 214 and the valve body 204. In some embodiments, the seal members 224 are seal rings formed from resilient materials. In some embodiments, the seal members 224 are O-ring seals. The piston 214 and the seal members 224 divide the relief volume 230 into an upper relief volume 220 and a lower relief volume 222. The upper relief volume 220 and the lower relief volume 222 are isolated from each other. The piston 214 moves vertically in the relief volume 230 changing the sizes of the upper relief volume 220 and the lower relief volume 222.

The upper relief volume 220 is in fluid communication with the upper section 232u of the valve bore 232. The lower relief volume 222 (or a lower end of the relief volume 230) is in fluid communication with the lower section 232l of the valve bore 232 through a flow path 212 formed between the valve body 204 and the housing 202. Dimension of the flow path 212 may be determined based on the dimension of the downhole isolation valve 200 and the working pressure of the downhole isolation valve 200. In some embodiments, dimension of the flow path 212 is designed to enable a fluid flow in a controlled manner under certain pressure range. In some embodiments, the flow path 212 may be an annular space between the valve body 204 and the housing 202.

The piston 214 may move vertically in the relief volume 230 under pressure differential between the upper relief volume 220 and the lower relief volume 222. The vertical movement of the piston 214 opens and closes the fluid communication between the relief ports 216 and the flow path 212 through the lower relief volume 222. In FIGS. 2A and 2B, the piston 214 is in a closed position where the piston 214 is in a first location to block the fluid communication between the relief ports 216 and the flow path 212. In FIG. 2C, the piston 214 is in an open position, where the piston 214 moves to a second location to at least partially open the relief ports 216 and the relief ports 216 are in fluid communication with the flow path 212.

Even though the example in FIGS. 2A-2C shows that the piston 214 directly interact with the relief ports 216 to selectively open and close the relief ports 216, a separate valve member, such as a sleeve member, may be connected to the piston 214 and operable to open and close the relief ports 216.

The pressure relief assembly 210 further includes a biasing member 218 configured to bias the piston 214 towards the closed position shown in FIGS. 2A-2B. The biasing member 218 is designed to allow the piston 214 to move away from the relief ports 216 when a pressure differential between the lower relief volume 222 and the upper relief volume 220 reaches an activation pressure differential. The activation pressure differential may be set according to properties of the flapper 206, such as yield strength, fracture strength, or an average of yield and fracture strengths of the flapper 206.

In the embodiment of FIGS. 2A-2C, the biasing member 218 includes one or more shear pins configured to fixedly attach the piston 214 to the valve body 204 or the housing 202. The one or more shear pins are configured to break when the pressure differential across the piston 214 reaches the activation pressure differential. The biasing member 218 may be other structures, such as resilient member, springs, or other suitable structures.

When the flapper 206 is open as shown in FIG. 2B, the pressure in the upper relief volume 220 and the pressure in the lower relief volume 222 are substantially the same, and the piston 214 remains in place.

When the flapper 206 is closed as shown in FIG. 2A, the pressure in the upper relief volume 220 substantially equals the pressure in the upper section 232u of the valve bore 232 while the pressure in the lower relief volume 222 substantially equals the pressure in the lower section 232l of the valve bore 232. Thus, the pressure differential across the piston 214 substantially equals the pressure differential across the flapper 206.

When the pressure differential across the flapper 206 reaches the activation pressure differential, the biasing member 218 gives in, i.e. the shear pins break, allowing the pressure differential across the piston 214 to move the piston 214 upwards as shown in FIG. 2C. In FIG. 2C, when the piston 214 moves away from the relief ports 216 or at least partially away from the relief ports 216, a relief flow path including the flow path 212, the lower relief volume 222 and the relief ports 216 is formed. The relief flow path allows the fluid in the lower section 232l flow to the upper section 232u in a controlled manner to reduce the pressure differential across the flapper 206, therefore, preventing the flapper 206 from rupturing.

FIGS. 3A-3D are schematic sectional views of a downhole isolation valve 300 according to another embodiment of the present disclosure. The downhole isolation valve 300 can be used in place of the isolation valve 120 in FIGS. 1A-1D. The downhole isolation valve 300 is similar to the downhole isolation valve 200 except that the downhole isolation valve 300 includes a resettable pressure relief assembly 310.

The pressure relief assembly 310 includes a resettable biasing member 318 configured to bias the piston 214 towards the closed position. The biasing member 318 is designed to allow the piston 214 to move at least partially away from the relief ports 216 when the pressure differential between the lower relief volume 222 and the upper relief volume 220 reaches the activation pressure differential.

Figure 3A:
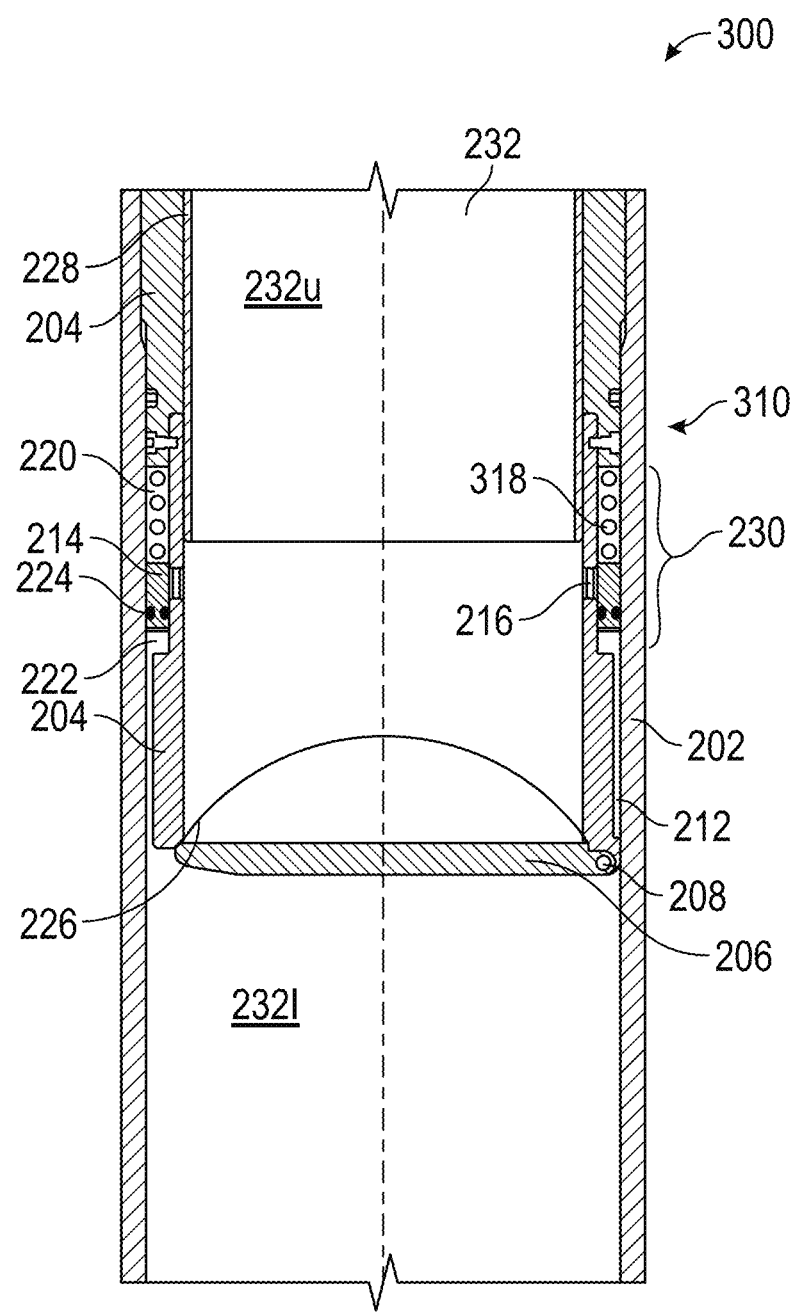
FIGS. 3A-3D are schematic sectional views of a downhole isolation valve according to another embodiment of the present disclosure.
Figure 3B:
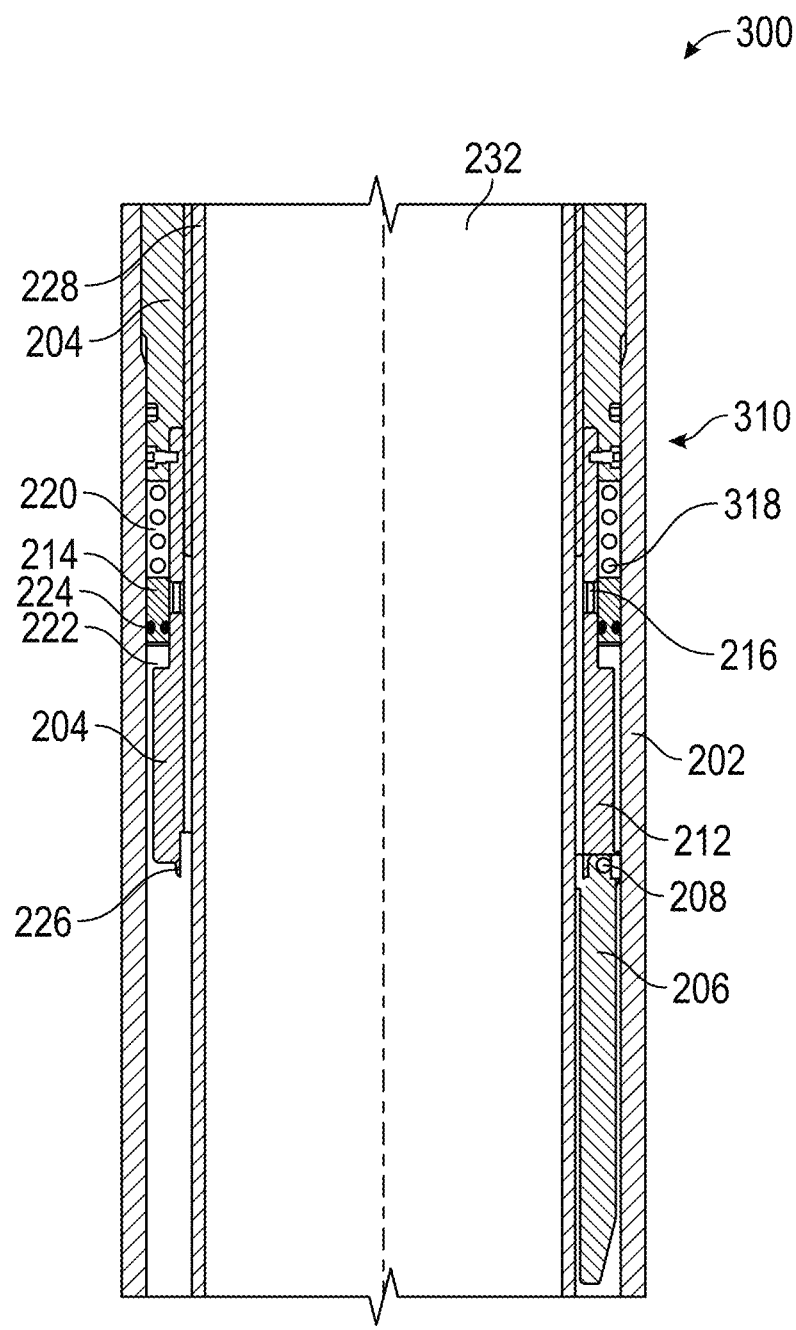
Figure 3C:
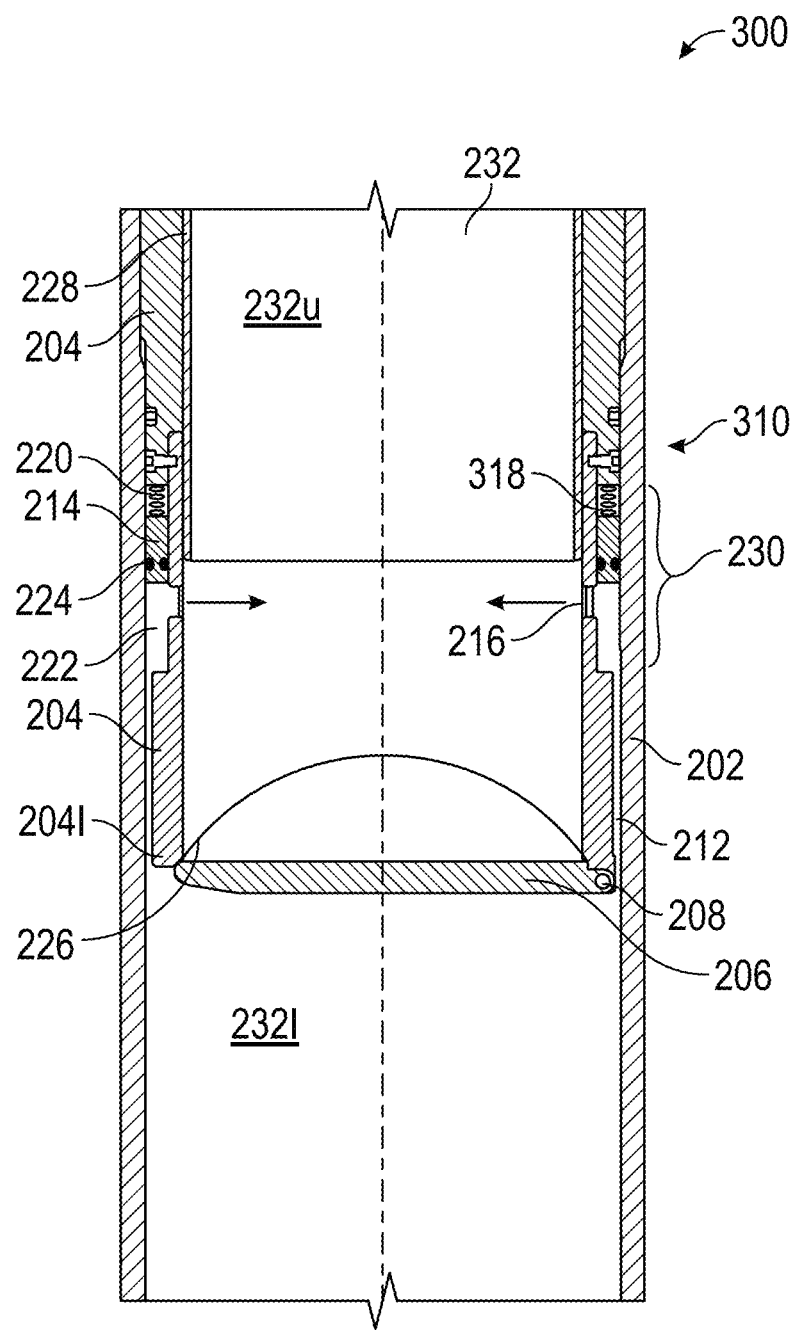
Figure 3D:
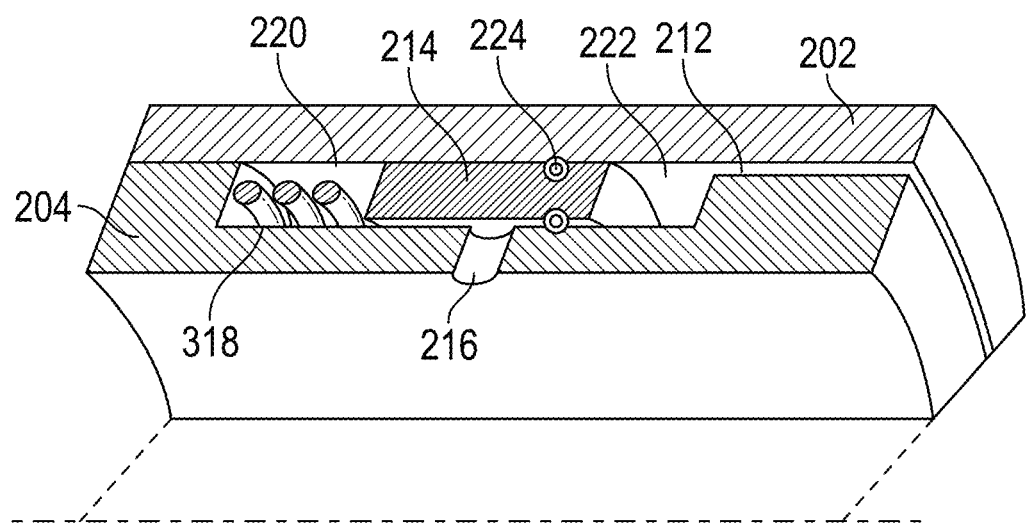

FIG. 3D is a schematic partial enlarged view of the downhole isolation valve 300 showing details of the pressure relief assembly 310. The biasing member 318 is a resilient member operable to move the piston 214 in the relief volume 230. In the embodiment of FIGS. 3A-3D, the biasing member 318 includes a spring disposed in the relief volume 230. The biasing member 318 may include a compression spring disposed in the upper relief volume 220.

When the flapper 206 is open or when the pressure differential across the flapper 206 is lower than the activation pressure differential, the biasing member 318 pushes the piston 214 downward to block the relief ports 216. When the pressure in the lower relief volume 222 is higher than the pressure in the upper relief volume 220 and as the pressure differential across the piston 214 increases, the pressure differential overcomes the resilient force of the biasing member 318 further compress the biasing member 318. When the pressure differential across the piston 214 reaches the activation pressure differential, the piston 214 is moved upward to open or at least partially open the relief ports 216.

Alternatively, the biasing member 318 may be an extension spring disposed in the lower relief volume 222, the pressure differential across the piston 214 may overcome the resilient force of the biasing member 318 to extend the biasing member 318 to open the relief ports 216.

When the flapper 206 is open as shown in FIG. 3B, the pressure in the upper relief volume 220 and the pressure in the lower relief volume 222 are substantially the same, and the piston 214 remains in place.

When the pressure differential across the flapper 206 reaches the activation pressure differential, the biasing member 318 compresses to a designed length moving the piston 214 away or at least partially away from the relief ports 216. In FIG. 3C, when the piston 214 moves away from the relief ports 216, a relief flow path including the flow path 212, the lower relief volume 222 and the relief ports 216 is formed.

When the pressure differential across the flapper 206 reduces, the biasing member 318 returns the piston 214 back to the closed position in FIG. 3A, therefore, resetting the pressure relief assembly 310.

Figure 4:
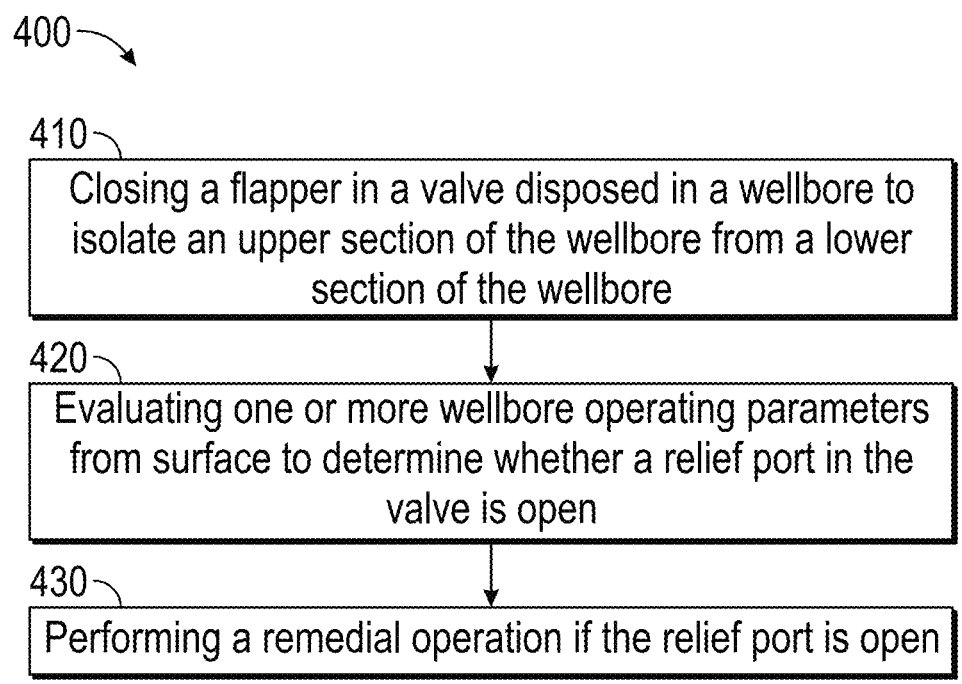
FIG. 4 is a schematic flow chart showing a method for performing a wellbore operation according to embodiments of the present disclosure.

FIG. 4 is a schematic flow chart showing a method 400 for performing a wellbore operation according to embodiments of the present disclosure. The method 400 may be performed in well systems similar to the well system 100 described above. Isolation valves according to the present disclosure, such as isolation valves 120, 200, 300 may be used in the method 400.

In operation 410, a flapper in an isolation valve disposed in a casing string is closed to isolate an upper section of the wellbore from a lower section of the wellbore. The isolation valve may be the isolation valves 120, 200, 300 according to the present disclosure. The isolation valve includes a pressure relief assembly configured to protect the flapper from rupturing when a pressure differential across the flapper approaches or exceeds a design pressure differential of the flapper. The operation 410 may be performed during various well operations. For example, the operation 410 may be performed to insert or remove a work string from the wellbore, to close the wellbore below the flapper for an extended period, to perform a well intervention operation, or other operations when isolating one section of a wellbore from another section of the wellbore is desired.

In operation 420, one or more operating parameters are evaluated from the surface to determining whether a relief port in the isolation valve has been open. Operation 420 may be performed by a controller on the surface, such as the controller 130 in the well system 100.

The relief port may open when the pressure differential across the flapper approaches or exceeds a design pressure of the flapper. The relief port provides a flow path between opposing sides of the flapper, allowing a fluid flow from the lower section of the wellbore below the flapper to the upper section of the wellbore in a controlled manner. The controlled fluid flow through the relief port reduces the pressure differential across the flapper.

In some embodiments, evaluating the one or more operating parameters includes monitoring a fluid flow across a wellhead over the wellbore. When the flapper is closed, a fluid flow across the wellbore indicates that there is a flow through the relief port and the pressure relief assembly in the isolation valve has been activated.

In operation 430, a remedial operation is performed upon detection of the activation of the pressure relief assembly. Operation 430 may be performed by a controller on the surface, such as the controller 130 in the well system 100.

The remedial operation may include one or more actions to protect the flapper or release pressure build up below the flapper. In some embodiments, the remedial operation includes adding fluid of a higher density in the upper section of the wellbore to reduce pressure differential across the flapper. In other embodiments, the remedial operation includes reducing the speed of work string movement in the wellbore to prevent rapid pressure drop in the upper section of the wellbore. In other embodiments, the remedial operation includes open and close the flapper to reset the isolation valve.

Embodiments of the present disclosure provide various advantages in oil and gas operation. For example, the pressure relief solution according to the present disclosure allows a controlled flow across a closed flapper valve when the pressure differential across the flapper approaches a design pressure of the flapper to mitigate an over-pressure situation. Using a pressure relief port through a valve body, the pressure relief solution does not compromise the structural integrity of the flapper. The pressure relieve solution provides early indication on the surface that the flapper operational range is being approached or exceeded. Well control measures, such as increasing fluid column to bring differential pressure across the flapper back into design specifications, can be performed. When used in downhole isolation valves, the pressure relief solution provides a means of addressing an over-pressure condition at the flapper, which may result from pressure build-up from the formation below. The pressure relief solution enables a controlled release of pressure around the flapper to prevent catastrophic failure of the downhole isolation valves and allows more time to address the over-pressure condition using well control method.

Embodiments of the present disclosure provide a valve assembly. The valve assembly comprises a housing, a valve body defining a valve bore and disposed in the housing, wherein a relief port is formed through the valve body, a flapper movably attached to the valve body between an open position and a closed position to open and close the valve bore, and a pressure relief assembly operable to open the relief port when a pressure differential across the flapper reaches an activation pressure differential.

In one or more embodiments, the pressure relief assembly is disposed between the valve body and the housing.

In one or more embodiments, the pressure relief assembly comprises a piston movably positioned in a relief volume formed between the housing and the valve body.

In one or more embodiments, the pressure relief assembly comprises a shear pin operable to secure the piston in a position to close the relief port.

In one or more embodiments, the pressure relief assembly comprises a biasing member operable to bias the piston to close the relief port.

In one or more embodiments, the biasing member comprises a spring member.

In one or more embodiments, the piston is movable in the relief volume from a first location to a second location, the relief port is closed when the piston is in the first location, and the relief port at least partially open when the piston is in the second location.

Some embodiments of the present disclosure provide a method for performing a wellbore operation. The method comprises closing a flapper in a valve disposed in a wellbore to isolate an upper section of the wellbore from a lower section of the wellbore, wherein the valve comprises a pressure relief assembly operable to open a relief port through the valve when a pressure differential across the flapper reaches an activation pressure differential, and evaluating one or more wellbore operating parameters from surface to determine whether the relief port is open.

In one or more embodiments, evaluating one or more wellbore operating parameters comprises monitoring a fluid flow from the upper section of the wellbore.

In one or more embodiments, the method further includes opening the relief port to allow a fluid flow from the lower section to the upper section.

In one or more embodiments, the method further includes performing a remedial operation to reduce the pressure differential across the flapper after opening the relief port.

In one or more embodiments, opening the relief port comprises applying the pressure differential across the flapper to a piston and moving the piston to open the relief port.

In one or more embodiments, the method further includes biasing the pressure relief assembly to a closed position using one or more shear pins in connection with the piston.

In one or more embodiments, the method further includes biasing the pressure relief assembly towards a closed position using a spring member in connection with the piston.

Some embodiments of the present disclosure provide an isolation valve. The isolation valve comprises a housing, a valve body disposed in the housing, wherein the valve body comprises a valve bore extending through the valve body, a relief volume formed between the valve body and the housing, a relief port formed through the valve body to provide fluid communication between the valve bore and the relief volume, a flapper coupled to the valve body and movable between an open position and a closed position to open and close the valve bore, a piston disposed in the relief volume, wherein the piston is movable to open and close the relief port, and a biasing member connected to the piston to bias the piston to close the relief port when a pressure differential across the flapper is less than an activation pressure differential.

In one or more embodiments, the biasing member comprises one or more shear pins positioned to fixedly attached the piston to the valve body.

In one or more embodiments, the one or more shear pins are operable to shear when the pressure differential across the flapper reaches the activation pressure differential.

In one or more embodiments, the biasing member comprises a spring member operable to bias the piston to close the relief port.

In one or more embodiments, the activation pressure differential is associated with a design pressure of the flapper.

In one or more embodiments, a lower end of the relief volume is in fluid communication with the valve bore.

While the foregoing is directed to implementations of the present disclosure, other and further implementation of the disclosure may be devised without departing from the basic scope thereof, and the scope thereof is determined by the claims that follow.

The invention claimed is:

1. A valve assembly, comprising:
a housing;
a valve body defining a valve bore and disposed in the housing, wherein a relief port is formed through the valve body;
a flapper movably attached to the valve body between an open position and a closed position to open and close the valve bore; and
a pressure relief assembly operable to open the relief port when a pressure differential across the flapper reaches an activation pressure differential, wherein the pressure relief assembly is disposed between the valve body and the housing, and the pressure relief assembly comprises:
a piston movably positioned in a relief volume formed between the housing and the valve body, wherein the piston divides the relief volume into a first relief volume and a second relief volume isolated from the first relief volume, the first relief volume is selectively in fluid communication with the valve bore, and the second relief volume is in fluid communication with a flow path between the housing and the valve body.

2. The valve assembly of claim 1, wherein the pressure relief assembly comprises a shear pin operable to secure the piston in a position to close the relief port.

3. The valve assembly of claim 1, wherein the pressure relief assembly comprises a biasing member operable to bias the piston to close the relief port.

4. The valve assembly of claim 3, wherein the biasing member comprises a spring member.

5. The valve assembly of claim 1, wherein the piston is movable in the relief volume from a first location to a second location, the relief port is closed when the piston is in the first location, and the relief port at least partially open when the piston is in the second location.

6. The valve assembly of claim 1, further comprising a seal member disposed between the piston and the housing, and between the piston and the valve body.

7. The valve assembly of claim 1, wherein the activation pressure differential correlates to one of a yield strength, a fracture strength, or an average of yield and fracture strengths of the flapper.

8. A method for performing a wellbore operation, comprising:
closing a flapper in a valve disposed in a wellbore to isolate an upper section of the wellbore from a lower section of the wellbore, wherein the valve comprises a pressure relief assembly operable to open a relief port through the valve when a pressure differential across the flapper reaches an activation pressure differential, and the activation pressure differential correlates to one of a yield strength, a fracture strength, or an average of yield and fracture strengths of the flapper;
opening the relief port to allow a fluid flow from the lower section to the upper section by applying the pressure differential across the flapper to a piston and moving the piston to open the relief port; and
evaluating one or more wellbore operating parameters from surface to determine whether the relief port is open.

9. The method of claim 8, further comprising:
biasing the pressure relief assembly to a closed position using one or more shear pins in connection with the piston.

10. The method of claim 8, further comprising:
biasing the pressure relief assembly towards a closed position using a spring member in connection with the piston, wherein the spring member is operable to bias the piston against a fluid pressure in the lower section of the wellbore.

11. A method for performing a wellbore operation, comprising:
   closing a flapper in a valve disposed in a wellbore to isolate an upper section of the wellbore from a lower section of the wellbore, wherein the valve comprises a pressure relief assembly operable to open a relief port through the valve when a pressure differential across the flapper reaches an activation pressure differential; and
   evaluating one or more wellbore operating parameters from surface to determine whether the relief port is open, wherein evaluating one or more wellbore operating parameters comprises monitoring a fluid flow from the upper section of the wellbore.

12. The method for claim 11, further comprising performing a remedial operation to reduce the pressure differential across the flapper after opening the relief port.

13. An isolation valve, comprising:
   a housing;
   a valve body disposed in the housing, wherein the valve body comprises a valve bore extending through the valve body, a relief volume is formed between the valve body and the housing, and a relief port is formed through the valve body to provide fluid communication between the valve bore and the relief volume;
   a flapper coupled to the valve body and movable between an open position and a closed position to open and close the valve bore;
   a piston disposed in the relief volume, wherein the piston is movable to open and close the relief port, the piston divides the relief volume into an upper volume and a lower volume isolated from the upper volume, the upper volume is selectively in fluid communication with the valve bore, and the lower volume is in fluid communication with a flow path between the housing and the valve body; and
   a biasing member connected to the piston to bias the piston to close the relief port when a pressure differential across the flapper is less than an activation pressure differential.

14. The isolation valve of claim 13, wherein the biasing member comprises one or more shear pins positioned to fixedly attached the piston to the valve body.

15. The isolation valve of claim 14, wherein the one or more shear pins are operable to shear when the pressure differential across the flapper reaches the activation pressure differential.

16. The isolation valve of claim 13, wherein the biasing member comprises a spring member operable to bias the piston to close the relief port.

17. The isolation valve of claim 13, wherein the activation pressure differential is associated with a design pressure of the flapper.

18. The isolation valve of claim 13, wherein a lower end of the relief volume is in fluid communication with the valve bore when the relief port is open.

19. The isolation valve of claim 13, further comprising a seal member disposed between the piston and the housing, and between the piston and the valve body.

20. The isolation valve of claim 13, wherein the activation pressure differential correlates to one of a yield strength, a fracture strength, or an average of yield and fracture strengths of the flapper.

* * * * *